(12) United States Patent
Espana Palomares

(10) Patent No.: US 10,393,895 B2
(45) Date of Patent: Aug. 27, 2019

(54) CALIBRATION OF MONOLITHIC CRYSTAL-BASED DETECTORS

(71) Applicant: MOLECUBES, Ghent (BE)

(72) Inventor: Samuel Espana Palomares, Madrid (ES)

(73) Assignee: MOLECUBES, Ghent (BE)

( * ) Notice: Subject to any disclaimer, the term of this patent is extended or adjusted under 35 U.S.C. 154(b) by 765 days.

(21) Appl. No.: 14/438,170

(22) PCT Filed: Oct. 28, 2013

(86) PCT No.: PCT/EP2013/072533
§ 371 (c)(1),
(2) Date: Apr. 23, 2015

(87) PCT Pub. No.: WO2014/064295
PCT Pub. Date: May 1, 2014

(65) Prior Publication Data
US 2015/0276953 A1   Oct. 1, 2015

(30) Foreign Application Priority Data

Oct. 26, 2012 (EP) .................................. 12190235

(51) Int. Cl.
*G01T 7/00* (2006.01)
*G06K 9/00* (2006.01)
*G06K 9/36* (2006.01)
*G01T 1/164* (2006.01)

(52) U.S. Cl.
CPC ............ *G01T 7/005* (2013.01); *G01T 1/1648* (2013.01); *G06K 9/00496* (2013.01); *G06K 2009/363* (2013.01)

(58) Field of Classification Search
CPC ................................................ G06K 9/00496
See application file for complete search history.

(56) References Cited

U.S. PATENT DOCUMENTS

| | | | |
|---|---|---|---|
| 6,476,394 B1* | 11/2002 | Amitani | G01T 1/2018 250/368 |
| 2010/0140487 A1* | 6/2010 | Barrett | G01T 1/1642 250/366 |
| 2011/0220783 A1* | 9/2011 | Tsukerman | G01T 1/1647 250/252.1 |

OTHER PUBLICATIONS

Dam et al., "Improved Nearest Neighbor Methods for Gamma Photon Interaction Position Determination in Monolithic Scintillator PET Detectors", IEEE Transactions on Nuclear Science, Apr. 12, 2011, pp. 1-9.

(Continued)

*Primary Examiner* — Marc Anthony Armand
(74) *Attorney, Agent, or Firm* — Workman Nydegger

(57) ABSTRACT

A calibration method for calibrating at least one gamma radiation detector includes a monolithic scintillation crystal. The calibration method comprises obtaining event data for a plurality of scintillation events. The event data for each scintillation event includes a plurality of location sensitive signals observed by the at least one gamma radiation detector to be calibrated, applying an unsupervised learning algorithm to embed the event data on a low-dimensional manifold, and obtaining calibration data considering the low-dimensional manifold embedding.

13 Claims, 7 Drawing Sheets

(56) References Cited

OTHER PUBLICATIONS

Espana et al., "Fast Calibration of SPECT Monolithic Scintillation Detectors Using Un-Collimated Sources", Physics in Medicine and Biology, vol. 58, No. 14, Jun. 21, 2013, pp. 4807-4825.
European Office Action From EP Application No. 13783911.4, dated May 29, 2017.
Hu et al., "Verification of Neural Network Based Algorithm for Crystal Identification of PET Block Detector", 2007 IEEE Nuclear Science Symposium Conference Record, May 4, 2007, pp. 2847-2850.
Hu et al., "A Neural Network Based Algorithm for Building Crystal Look-up Table of PET Block Detector", 2006 IEEE Nuclear Science Symposium Conference Record, Nov. 17, 2006, pp. 2458-2461.
International Search Report From PCT Application No. PCT/EP2013/072533, Jan. 10, 2014.
Lazzerini et al., "Calibration of Positron Emission Tomograph Detector Modules Using New Neural Method", Electronics Letters, vol. 40, No. 6, Mar. 18, 2004, 2 pages.
Li et al., "Nonlinear Least-Squares Modeling of 3D Interaction Position in a Monolithic Scintillator Block", Physics in Medicine and Biology, vol. 55, Oct. 19, 2010, pp. 6515-6532.

\* cited by examiner

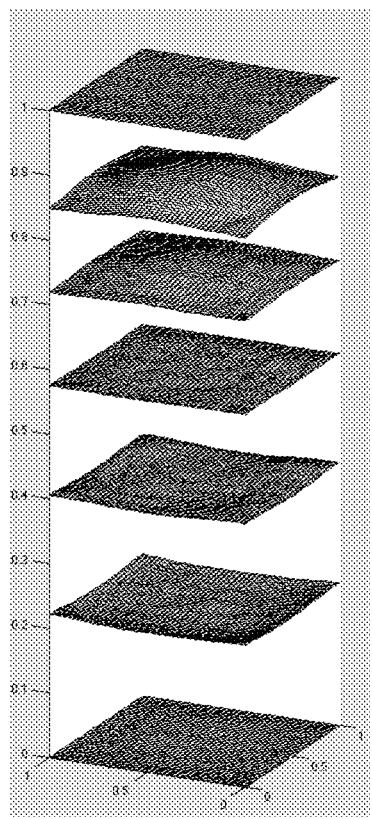
FIG. 4
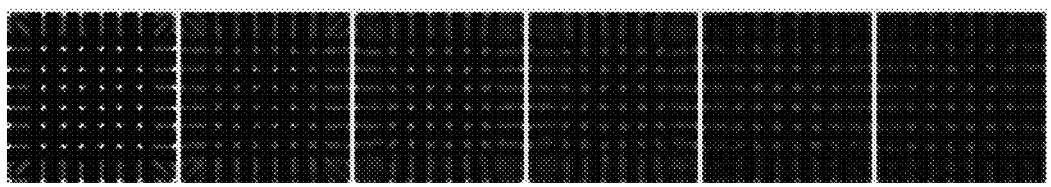
FIG. 5
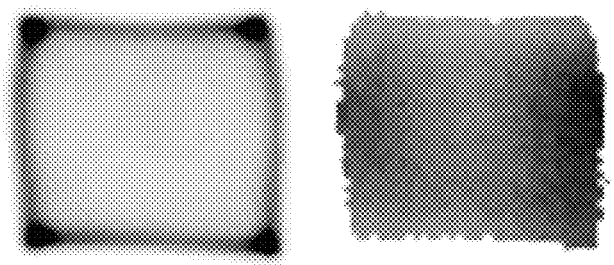
FIG. 6    FIG. 7 c=40, t=500    c=8, t=100    $\sigma_0$=6.12, t=450    $\sigma_0$=3.05, t=160    N=$10^5$, t=1000    N=2·$10^4$, t=1000

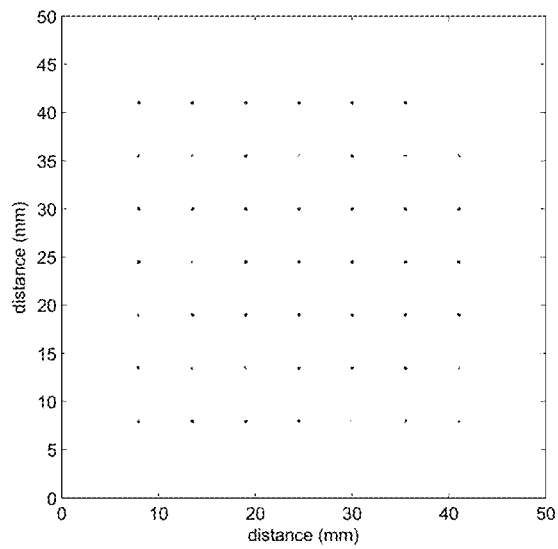
FIG. 20
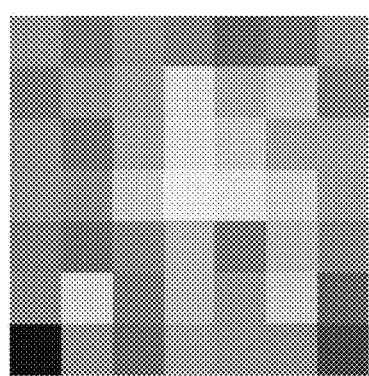
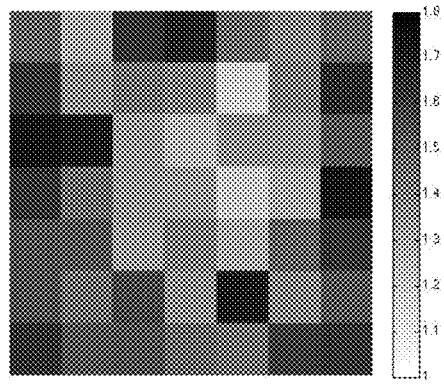
FIG. 21  FIG. 22

CALIBRATION OF MONOLITHIC CRYSTAL-BASED DETECTORS

FIELD OF THE INVENTION

The invention relates to the field of detectors for emission tomography. More specifically, it relates to a method and device for performing a self-calibration of a monolithic crystal-based detector for emission tomography.

BACKGROUND OF THE INVENTION

Detectors based on monolithic scintillation crystals, for example monolithic scintillation detectors for Positron Emission Tomography (PET) or Single Photon Emission Computed Tomography (SPECT) imaging, have many advantages over pixelated detectors. Replacing pixelated detectors by monolithic scintillation crystal detectors may reduce the cost per unit volume and may increase the sensitivity and the spatial, energy and timing resolution of the detector. In addition, on thick monolithic crystal-based detectors, the depth-of-interaction (DOI) may be determined without additional hardware. However, monolithic crystal-based detectors are known to perform poorly if a conventional, simple method known in the art is used for obtaining spatial information of interaction events. Such a conventional method could for example comprise a centroid calculation, e.g. Anger logic, followed by a distortion correction.

Improved performance has been obtained by introducing different techniques, e.g. maximum likelihood, artificial neural networks or k-nearest neighbours, which make use of training data characterized by known interaction locations. Information derived from these training data may then be used for the positioning of new events. However, the acquisition of training data may be a complex and time-consuming process, may happen off-line and may require an accurate robotic stage. These drawbacks entail the main limitation for practical use of monolithic crystals in commercial systems.

In order to achieve a good detector performance, monolithic detectors may require costly and complex calibration procedures, which may have slowed the introduction of monolithic crystal-based detectors in current commercial systems. The calibration procedures known in the art often require training data, and thus require a long and complex procedure for obtaining these training data. For example, such methods may require data acquisition over many hours or even days in order to calibrate one detector. If several detectors need to be calibrated in parallel, this entire setup has to be replicated as many times. In addition, calibration procedures known in the art cannot be performed on detectors which are already assembled in the gantry of the imaging scanner, since this may not allow a proper follow-up of the calibration status.

Therefore, there exists a need for a simple and efficient calibration method, such that monolithic crystal detectors may become feasible in commercial scanners. Some efforts have been made to simplify the acquisition of training data. However, the training process may still require individual detector calibration for non-assembled detectors, which does not allow for detector recalibration once the detectors are assembled in the system and the system is operational in the field. This also constitutes an important drawback in modern systems that use avalanche photo diode (APD) detectors or silicon photomultiplier (SiPM) photosensors for the readout of the scintillation crystals. The performance of those devices (gain, dark current, photon detection efficiency (PDE) . . . ) is very sensitive to temperature and supplied voltage variations, requiring for flexible calibration procedures under different working conditions. One such method may be disclosed by Dam et al., in "Improved Nearest Neighbor Methods for Gamma Photon Interaction Position Determination in Monolithic Scintillator PET Detectors", IEEE Transactions on Nuclear Science, 58(5), pages 2139 to 2147.

Other known positioning methods, which are not based on training data may have been disclosed, but these may be based on parameterized models of the detector response. Such methods rely on accurate knowledge of the detector response and the variable performance of the detector. For example, methods may be known in the art which use parametric modelling, such that no training data are needed. Such parametric modelling calibration methods may rely on assumptions made on detector behaviour. However, various factors which are difficult to predict in an analytical approach may influence the behaviour of a detector significantly, such as assembling differences, photosensor gain variations, electronic noise, or couplings. Therefore, a method for calibration that takes measurable data for each specific detector into account is desired. For example, one such parametric method may be disclosed by Zhi et al., in "Nonlinear least-squares modeling of 3D interaction position in a monolithic scintillator block," Phys. Med. Biol. 55 (2010) 6515-6532.

SUMMARY OF THE INVENTION

It is an object of embodiments of the present invention to provide simple and efficient calibration for monolithic crystal detectors.

It is an advantage of embodiments of the present invention that a cheap and simple calibration method is provided. It is a further advantage of embodiments of the present invention that a calibration is provided which may be performed in the field, e.g. on a detector which is assembled in a gantry of an imaging system.

It is an advantage of embodiments of the present invention that a calibration can be performed which uses only training data that is easily obtainable, e.g. comparable to other measurements typically performed for quality assurance on regular basis.

It is an advantage of embodiments of the present invention that a calibration can be performed which depends only on prior knowledge of the distribution of gamma interactions within the detector for the training data. It is a further advantage of embodiments of the present invention, that such distribution can be obtained accurately from Monte Carlo simulations.

It is an advantage of embodiments of the present invention that an emission detection system is provided with a low cost per unit volume, high sensitivity, and high spatial, energy, and timing resolution.

It is an advantage of embodiments of the present invention that an emission detection system is provided in which the depth-of-interaction (DOI) can be easily determined.

It is an advantage of embodiments of the present invention that a calibration method is provided which enables high performance of monolithic crystal detectors in clinical applications.

It is an advantage of embodiments of the present invention that a calibration method is provided that is based on training data for simple activity source geometries and un-collimated beams or point sources, such that the training data can be acquired in a reasonable time without the need for any robotic system.

It is an advantage of embodiments of the present invention that a monolithic detector can be calibrated using a simple training data set.

It is an advantage of embodiments of the present invention that calibration of a plurality of detectors of a scanner, e.g. all detectors of a scanner, can be performed at the same time. It is a further advantage of embodiments of the present invention that such calibration may be performed while the detectors are assembled in the scanner gantry. It is a further advantage of embodiments of the present invention that thus easy calibration, quality control and follow up of the calibration status of the scanner may be provided.

It is an advantage of embodiments of the present invention that calibration is provided which only requires simple radioactive sources, e.g. a point source, but which is not limited to one type of radioactive source or to simple radioactive sources.

It is an advantage of embodiments of the present invention that no or only few assumptions about transport of optical photons, electronics conversion, gain uniformity of photosensors, coupling or other detector-specific behavior are needed.

The above objective is accomplished by a method and device according to the present invention.

In a first aspect, the present invention provides a calibration method for calibrating at least one gamma radiation detector comprising a monolithic scintillation crystal. This calibration method comprises obtaining event data for a plurality of scintillation events, in which the event data comprise, for each scintillation event, a plurality of location sensitive signals observed by the at least one gamma radiation detector to be calibrated, the event data forming an N-dimensional space. The method further comprises applying an unsupervised learning algorithm to embed at least part of the event data on a low-dimensional manifold having M dimensions, M being smaller than N, and obtaining calibration data for linking event data for a scintillation event to a spatial region where this scintillation event took place. This obtaining calibration data thereby taking the low-dimensional manifold embedding into account.

A calibration method according to embodiments of the present invention may further comprise correcting the calibration data for distortion, in which this correcting takes information about the predetermined distribution of radiation into account.

In a calibration method according to embodiments of the present invention, the plurality of location sensitive signals may be representative of a spatial distribution of scintillation light in said monolithic scintillation crystal.

In a calibration method according to embodiments of the present invention, the low-dimensional manifold may be commensurate with at least two physical spatial dimensions of the monolithic scintillation crystal.

In a calibration method according to embodiments of the present invention, obtaining event data for a plurality of scintillation events may comprise exposing the at least one gamma radiation detector to a predetermined distribution of radiation, and recording event data for a plurality of scintillation events, in which the event data comprises for each scintillation event a plurality of location sensitive signals observed by the at least one gamma radiation detector.

In a calibration method according to embodiments of the present invention, applying the unsupervised learning algorithm may comprise applying a nonlinear dimensionality reduction algorithm for learning the low-dimensional manifold embedded in a space with dimensionality corresponding to the plurality of location sensitive signals.

In a calibration method according to embodiments of the present invention, the unsupervised learning algorithm may comprise a learning algorithm for determining a self-organizing feature map.

A calibration method according to embodiments of the present invention, may furthermore comprise determining data clusters from the event data, and initializing the unsupervised learning algorithm taking into account the data clusters. It is an advantage of embodiments according to the present invention that robust calibration can be obtained.

In a calibration method according to embodiments of the present invention, determining the data clusters may comprise applying a Linde-Buzo-Gray vector quantization algorithm.

In a calibration method according to embodiments of the present invention, exposing the at least one gamma radiation detector to the predetermined distribution of radiation may comprise placing a radioactive source in the field of view of the at least one gamma radiation detector. It is an advantage of embodiments of the present invention that reproducible and robust event data can be easily obtained.

In a calibration method according to embodiments of the present invention, the radioactive source may be placed such that at least two gamma radiation detectors receive a substantially identical distribution of radiation from the radioactive source. It is an advantage of embodiments of the present invention that multiple detectors can be calibrated substantially simultaneously, e.g. an imaging scanner comprising a plurality of detectors can be calibrated quickly and efficiently.

Alternatively or in addition to the use of a radiation source with predetermined distribution of radiation, the calibration method according to embodiments of the present invention may be performed based on a previously obtained information, such as for example results of a previous calibration procedure.

In a calibration method according to embodiments of the present invention, the radioactive source may be placed at a distance from the at least one gamma radiation detector, and this distance may be equal to or greater than the largest spatial extent of the monolithic scintillation crystal. For example, this distance may be at least five times the largest spatial extent of the monolithic scintillation crystal. It is an advantage of embodiments of the present invention that a substantially uniform spatial distribution of radiation is attained over the at least one monolithic crystal-based detector.

In embodiments according to the present invention, training data may be used for training the learning algorithm.

In a second aspect, the present invention provides a nuclear imaging system which comprises at least one gamma radiation detector comprising a monolithic scintillation crystal. The system further comprises a processing unit, in which this processing unit is adapted for recording event data for a plurality of scintillation events, the event data comprising for each scintillation event a plurality of location sensitive signals observed by the at least one gamma radiation detector and the event data forming an N dimensional space. The processing unit is further adapted for applying an unsupervised learning algorithm to embed at least part of the event data on a low-dimensional manifold, the low-dimensional manifold having M dimensions, M being smaller than N, and for obtaining calibration data taking into account this low-dimensional manifold embedding. This calibration data may be suitable for linking event data for a scintillation event to a spatial region where this scintillation event took place.

In a nuclear imaging system according to embodiments of the present invention, the monolithic scintillation crystal may comprise a LYSO, LGSO, BGO or NaI monolithic crystal.

In a nuclear imaging system according to embodiments of the present invention, the at least one gamma radiation detector may comprise a position sensitive light sensor.

In a nuclear imaging system according to embodiments of the present invention, the position sensitive light sensor may comprise an avalanche photodiode array, a position sensitive photomultiplier tube or an array of photomultiplier tubes.

The present invention further provides a processor for calibrating at least one gamma radiation detector comprising a monolithic scintillation crystal. The processor comprises an input means for obtaining event data for a plurality of scintillation events, in which the event data comprise, for each scintillation event, a plurality of location sensitive signals observed by said at least one gamma radiation detector to be calibrated. The processor is furthermore configured for applying an unsupervised learning algorithm to embed said event data on a low-dimensional manifold, and for obtaining calibration data taking into account the low-dimensional manifold embedding.

The present invention also provides a computer program product for, if implemented on a processing unit, performing a method according to the first aspect of the present invention. The present invention also provides a non-transitory data carrier storing such computer program product. The present invention also provides transmission of such computer program productover a network.

Particular and preferred aspects of the invention are set out in the accompanying independent and dependent claims. Features from the dependent claims may be combined with features of the independent claims and with features of other dependent claims as appropriate and not merely as explicitly set out in the claims.

These and other aspects of the invention will be apparent from and elucidated with reference to the embodiment(s) described hereinafter.

BRIEF DESCRIPTION OF THE DRAWINGS

FIG. 4 shows a grid transformation obtained using the 3D version of the Monge-Kantorovich grid adaptation method on the distribution of training data in the 3D map after SOM learning, in accordance with embodiments of the present invention.

FIG. 5 illustrates the application of the SOM map and distortion correction according to embodiments of the present invention on a 5 mm step scan grid. Several detector slices are shown starting on the left with the section close to the PS-PMT.

FIG. 6 shows a flood map used to filter by energy the event data acquired with the SPECT detector, according to embodiments of the present invention.

FIG. 7 shows photopeak positions used to filter by energy the event data acquired with the SPECT detector, according to embodiments of the present invention.

FIG. 20 shows lines joining the average centroid positions and the real positions for the inner 7×7 scan positions, corresponding to the histogram shown in FIG. 17.

FIG. 21 shows the spatial resolution obtained on the inner 7×7 scan positions from the 5.5 mm grid scan using MLE, in accordance with a prior art calibration method.

FIG. 22 shows the spatial resolution obtained on the inner 7×7 scan positions from the 5.5 mm grid scan using a self-calibration method according to the present invention.

Figure 1:
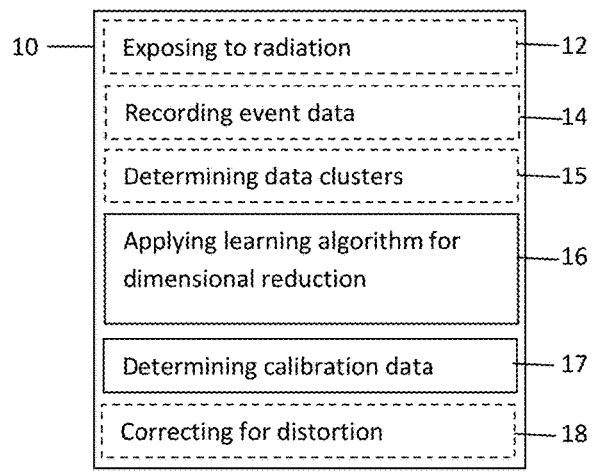
FIG. 1 shows an exemplary method according to an embodiment of the present invention.

The drawings are only schematic and are non-limiting. In the drawings, the size of some of the elements may be exaggerated and not drawn on scale for illustrative purposes.

Any reference signs in the claims shall not be construed as limiting the scope.

In the different drawings, the same reference signs refer to the same or analogous elements.

DETAILED DESCRIPTION OF ILLUSTRATIVE EMBODIMENTS

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. The dimensions and the relative dimensions do not correspond to actual reductions to practice of the invention.

Furthermore, the terms first, second and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein.

Moreover, the terms top, under and the like in the description and the claims are used for descriptive purposes and not necessarily for describing relative positions. It is to be understood that the terms so used are interchangeable under appropriate circumstances and that the embodiments of the invention described herein are capable of operation in other orientations than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

In the description provided herein, numerous specific details are set forth. However, it is understood that embodiments of the invention may be practiced without these specific details. In other instances, well-known methods, structures and techniques have not been shown in detail in order not to obscure an understanding of this description.

When in embodiments of the present invention reference is made to a low-dimensional manifold, reference is made to a topological space that near each point resembles a low-dimensional Euclidean space, for example a two-dimensional or three-dimensional space. More precisely, each point on such manifold has a neighbourhood that is homeomorphic to the low-dimensional Euclidean space. Thus, while a low-dimensional manifold may simply refer to a low-dimensional Euclidean space, e.g. a 2D or 3D Euclidean space, it may also refer in general to a low-dimensional curved space, e.g. a space which can be described by Riemannian geometry.

An embedding, of for example data on a low-dimensional manifold, refers to an instance of some mathematical structure, for example data on the low-dimensional manifold, the low-dimensional manifold having M dimensions, being contained within another instance, such as a high-dimensional space from which data is sampled, e.g. an Euclidean space, the high-dimensional space having N dimensions, the high-dimensional space thus having more dimensions than the low-dimensional manifold, i.e. M being smaller than N, for example an Euclidean space having at least 4 dimensions, or having at least 16 dimensions, or an Euclidean space having 64 dimensions or even more dimensions, for example 256 dimensions. When some object is said to be embedded in another object, the embedding can be given by some injective and local structure-preserving map, although such map need not be determined explicitly, e.g. may be provided by an implicit encoding, for example in a neural network.

When in embodiments of the present invention reference is made to a monolithic scintillation crystal, reference is made to an undivided or continuous block of scintillator material read out by an array of photosensitive sensor devices. The scintillation photons generated in the monolithic scintillation crystal can travel completely free inside the scintillator block and the light is spread all over the array of photosensitive sensor devices. Contrary, pixelated or segmented scintillation crystals comprise a plurality of small scintillation crystal tubes separated from each other with reflective material. The scintillation light generated in such a segmented or pixelated scintillation crystal is therefore transmitted and focused into a small area of the array of photosensitive sensor devices.

In some embodiments, N may correspond with the number of photosensitive sensor devices and M may correspond with 2, e.g. for a thin SPECT crystal, or 3, e.g. for a thick PET crystal.

When in embodiments of the present invention reference is made to a gamma radiation detector, reference is made to a detector comprising at least one monolithic scintillator, e.g. a scintillator crystal, for absorbing energy from incident gamma radiation and re-emitting the absorbed energy in the form of scintillation light. Such scintillation light comprises photons of lower energy than the incident gamma radiation, e.g. photons having an energy or energy distribution in or below the ultraviolet spectrum, e.g. visible light. Such gamma radiation detector further may comprise at least one photosensitive sensor device, for example a photomultiplier tube or an avalanche photodiode, for generating at least one electric signal, e.g. a voltage, current or electric charge, in response to the scintillation light. A scintillation light emission of absorbed gamma radiation energy in the scintillator is further herein referred to as a scintillation event, radiation-matter interaction in the scintillator or simply as an 'event'. The at least one electric signal generated in response to the scintillation light emitted by such event, or a representation of such signal, e.g. in digitally quantized form, is referred to as event data.

A method according to embodiments of the present invention is suitable for calibrating at least one gamma radiation detector, e.g. may be suitable for calibrating a plurality of gamma radiation detectors simultaneously, for example, such method may be suitable for calibrating a nuclear imaging scanner, e.g. a SPECT or PET system, comprising a plurality of gamma radiation detectors.

Where in embodiments of the present invention reference is made to training data, this refers to data which is obtained from event data, e.g. the training data may refer directly to event data acquired by a gamma radiation detector, or training data may refer to a subset of such event data, e.g. after rejection of nuisance events by energy windowing, or training data may refer to data derived from such event data, e.g. by transforming said event data into another representation, for example, by applying an injective or even a non-injective function to this event data. In a first aspect, the present invention relates a calibration method for calibrating at least one gamma radiation detector comprising a monolithic scintillation crystal. This calibrating may be a position calibration to link an indirectly observed radiation-matter interaction event in the monolithic crystal, e.g. observed as scintillation light, to a spatial region, e.g. a spatial position, where this interaction event took place. Furthermore, this calibrating may additionally also comprise an energy calibration to link an indirectly observed radiation-matter interaction event in the monolithic crystal, e.g. observed as scintillation light, to the amount of energy transferred in this radiation-matter interaction event.

This calibration method comprises obtaining event data, which may comprise exposing the at least one gamma radiation detector to a predetermined distribution of radiation and recording event data for a plurality of scintillation events. These event data comprise, for each scintillation event, a plurality of location sensitive signals observed by the at least one gamma radiation detector. The event data form an N-dimensional space. The method further comprises applying an unsupervised learning algorithm to embed these event data on a low-dimensional manifold having M dimensions, M being smaller than N, and obtaining calibration data taking into account the low-dimensional manifold embedding.

Referring to FIG. 1, an exemplary method 10 according to embodiments of the present invention is illustrated. This method 10 is intended for calibrating at least one gamma radiation detector comprising a monolithic scintillation crystal.

The calibration method 10 comprises the step of obtaining event data for a plurality of scintillation events, the event data comprising for each scintillation event a plurality of location sensitive signals 30 observed by said at least one gamma radiation detector 20 to be calibrated. Such obtaining event data may include receiving the data as input, whereby the input is pre-stored, e.g. previously measured. Alternatively, the obtaining step may include the actual acquisition step. Such acquisition may comprise exposing 12 the at least one gamma radiation detector to a predetermined distribution of radiation. Exposing 12 the at least one gamma radiation detector to the predetermined fluence distribution of radiation may comprise placing a radioactive source with a predetermined fluence distribution in the field of view of the at least one gamma radiation detector, e.g. placing this radioactive source at a predetermined position and orientation with respect to the at least one gamma radiation detector. The fluence distribution thereby defines the relative particle count as function of location in the detector. Since such exposure does not require a complex sequence of different irradiation conditions, e.g. scanning positions of the scintillation crystal using robotized movement of a source and/or collimator, but merely a reproducible positioning of a calibrated radiation source, reproducible and robust event data may be easily collected according to embodiments of the present invention.

When more than one gamma radiation detector are calibrated using a method 10 according to embodiments of the present invention, the radioactive source may be placed such that at least two gamma radiation detectors receive a substantially identical distribution of radiation from the radioactive source. Preferably, the radioactive source may be placed such that all gamma radiation detectors receive a substantially identical distribution of radiation. For example, a isotropic radioactive source, e.g. approximating a point source, may be placed equidistantly from all gamma radiation detectors, for example, if the gamma radiation detectors are mounted on a gantry ring of a nuclear imaging system, e.g. a SPECT or PET system, the radiation source may be placed centrally in the gantry ring. It will be noted that such arrangement may allow simultaneous calibration of multiple, or all, gamma radiation detectors. Even if the processing steps further detailed hereinbelow would not be performed simultaneously, this arrangement still allows the simultaneous collection of event data on multiple, or all, gamma radiation detectors, thereby providing an appreciable low calibration time cost in comparison to known calibration methods in the art. Since simple point source geometries or uncollimated beams may suffice to provide sufficient event data for calibration, these event data may be acquired in very reasonable time, e.g. a time comparable to many other quality assurance measurements that often used in practice. In addition, these event data may be acquired once the detectors are assembled into an imaging system, e.g. a SPECT or PET system, and therefore, a follow-up of the detectors performance and re-tuning can be performed without substantial intervention, e.g. disassembly of the system. However, for a detector assembled in a SPECT system, it may be preferable to remove the collimator before calibration.

The radioactive source may be placed at a distance from the at least one gamma radiation detector, in which this distance is equal to or greater than the largest spatial extent of the monolithic scintillation crystal. Thus, the radioactive source may be placed such that a substantially uniform gamma radiation distribution is attained in the monolithic scintillation crystal.

When placing a radioactive source in the field of view of the scanner, the radioactive source may have a point, line or plane geometry. The geometry of the radioactive source may be chosen, as will be clear to the person skilled in the art, to provide good results taking the geometry of the gamma radiation detector, or even taking the geometry of the imaging system containing the gamma radiation detector or detectors, into account. This radioactive source may be positioned such that a plurality of detectors of the imaging system receive a distribution of gamma interactions of substantially equal magnitude. The distribution of gamma interactions in each and/or every gamma radiation detector may be obtained using Monte Carlo simulations. Thus the radiation distribution on the gamma radiation detector may be calculated and thus may be predetermined by the radioactive source geometry, source activity and relative position with respect to the at least one gamma radiation detector.

Since the method 10 according to embodiments of the present invention takes event data acquired with the detector into account, no stringent assumptions about detector-specific behavior need to be made, e.g. about transport of optical photons, electronics conversion, gain uniformity of photosensors or coupling. Therefore, calibration of the energy, positioning and uniformity of the detector may be performed using the same set of event data in one integrated procedure.

The energy of the gamma photons emitted by the radioactive source may be chosen as function of the intended application of the detector. If a high energy gamma source, e.g. Co-60 which has 1.17 MeV and 1.33 MeV energy peaks, is used for calibrating a detector in a PET system or intended for a PET system, a higher fraction of single interaction events are obtained compared to 511 keV photons. This may allow a calibration with small dependence on the incident angle.

Acquisition in the calibration method 10 further may comprise the step of recording 14 event data for a plurality of scintillation events, in which these event data comprise, for each scintillation event, a plurality of location sensitive signals observed by the at least one gamma radiation detector. This plurality of location sensitive signals may be representative of a spatial distribution of scintillation light in the monolithic scintillation crystal.

When a high number of events, e.g. at least 1,000,000 events, are acquired for each gamma radiation detector, little influence of noise may be attained in the calibration process. As will be apparent to the person skilled in the art, the number of events to obtain an acceptable calibration may be determined by the noise characteristics of the detector and the intended spatial resolution. For example, if the calibration is intended to differentiate between a number of spatial regions, e.g. locations in the monolithic crystal, the number of events may be, for example, at least 50 times this number of spatial regions, or preferably 100 times this number of spatial regions, or even more, for example 1000 times this number of spatial regions.

Once the event data is obtained, in embodiments according to the present invention, the calibration method 10 may also comprise the step of determining 15 data clusters from these event data, e.g. using a k-means clustering algorithm. For example, determining 15 these data clusters may comprise applying a Linde-Buzo-Gray vector quantization algorithm.

For example, once the event data are acquired, the events may be filtered by energy window, e.g. events which do not correspond to the energy window in which primary radiation-matter interactions are to be expected may be rejected taking into account the incident radiation energy spectrum. As energy calibration may be position dependent, events from similar positions may be grouped first, energy calibration may be performed within the events of each group and those events within the prescribed energy window may be filtered, e.g. maintained in the event data while the remaining events are rejected. It will be clear that the position of the groups, e.g. the physical location where the scintillation events in this group took place, need not to be known for this clustering and/or energy filtering, only the assumption that events within each group belong to nearby positions is required.

To split the events in different groups a vector quantization approach may be used, e.g. a Linde-Buzo-Gray algorithm, in which the number of groups may be predefined. The number of groups may be chosen equal to or close to the product of the spatial extent in each dimension, e.g. spatial direction, of the monolithic scintillation crystal divided by half of the expected spatial resolution in that dimension. It will be apparent to the person skilled in the art that many other clustering methods, e.g. unsupervised clustering algorithms, could be used to fulfill this step of the process.

The calibration method 10 further comprises the step of applying 16 an unsupervised learning algorithm to embed these event data on a low-dimensional manifold. This low-dimensional manifold may be commensurate with at least two physical spatial dimensions of the monolithic scintillation crystal. For example, the low-dimensional manifold may be a two-dimensional manifold encoding a position coordinate corresponding to a location in the monolithic scintillation where the scintillation event took place, for example a two-dimensional Cartesian coordinate encoding. Alternatively, the low-dimensional manifold may be a three-dimensional manifold encoding a position coordinate as above for the two-dimensional example and additionally a third coordinate indicative of the depth of interaction of the scintillation event in the monolithic scintillation crystal.

Furthermore, in embodiments of the present invention comprising a step for determining 15 data clusters from the event data, these data clusters may advantageously be used for initializing the unsupervised learning algorithm, e.g. initializing the unsupervised learning algorithm taking into account the data clusters.

In embodiments according to the present invention, applying 16 the unsupervised learning algorithm may comprise applying a nonlinear dimensionality reduction algorithm for learning this low-dimensional manifold embedded in a space with dimensionality corresponding to the plurality of location sensitive signals. For example, the unsupervised learning algorithm may comprise a learning algorithm for determining a self-organizing feature map.

This unsupervised learning algorithm may preferably be applied to the filtered event data, e.g. the event data which where maintained after an energy window filtering as described above. The event data may be organized in a map, e.g. a self-organizing map, with as many dimensions as the desired position calibration, e.g. typically two for a position calibration in the plane of the detector, or three dimensions for a planar position calibration together with a depth of interaction calibration. Such self-organizing map may comprise an artificial neural network, e.g. a Kohonen self-organizing map as known in the art. Such self-organizing map may be used to organize the event data in a grid, e.g. in a two or three dimensional matrix, which may have a size proportional to the size of the monolithic crystal. The number of grid elements, e.g. pixels, in each dimension may be at least two or three times the size of the detector in the corresponding spatial direction divided by the spatial resolution expected in that direction.

Applying 16 the unsupervised learning algorithm to embed the event data on a low-dimensional manifold may also comprise other techniques for organizing the events by dimensionality reduction, such as for example multidimensional scaling or principal component analysis. Alternatively, the unsupervised learning algorithm may comprise a clustering technique combined with a similarity analysis and a suitable energy function defined as the distance to the other events according to their similarity and minimized by some other method like for example simulated annealing.

Furthermore, the calibration method 10 comprises obtaining 17 calibration data taking into account this low-dimensional manifold embedding. Obtaining such calibration data may comprise defining a projection function which maps event data e.g. a plurality of location sensitive signals observed for a scintillation event, onto the low-dimensional manifold, e.g. on a set of two or three coordinates corresponding to a position on the low-dimensional manifold and thus representative of a position for the scintillation event in the monolithic scintillation crystal. For example, when the low-dimensional manifold was determined by a self-organizing map, obtaining this calibration data may comprise storing a representation of the self-organizing map which allows for event data corresponding to a scintillation event to identify the corresponding grid, e.g. matrix, element in the self-organizing map.

In embodiments according to the present invention, the calibration method 10 may further comprise correcting 18 the calibration data for distortion, in which this correcting takes information into account about the predetermined distribution of radiation.

For example, a histogram with the number of events in the event data that map to each cell of the self-organizing map may be generated. This map may then be compared with the predetermined distribution of radiation, e.g. the predetermined distribution of radiation interactions obtained with Monte Carlo simulations. Correcting the calibration data for distortion may thus be obtained by deforming the obtained map to match the predetermined distribution while keeping the external shape of the map, which corresponds to the detector shape, as a boundary condition. For example, such correction may be effected by grid adaptation using Monge-Kantorovich optimization. This Monge-Kantorovich optimization may be used to calculate the grid transformation that makes both distributions match under an optimal deformation.

Such distortion correction may also be performed according to another method known in the art. For example, a distortion correction may also be effected by performing an additional event data acquisition, while a collimator containing a set of holes with known positions is placed in front of the detector. This allows to establish a relation between the position as determined by the calibration data, e.g. as determined by the self-organized map, and the actual positions of these pinholes.

In addition, there exist variations of the self-organizing map process that may be used to obtain cells with equal number of events and later deformed to match the known distribution of events, for example an elastic net implementation to penalize non-uniform distribution of events, e.g. to avoid concentration of events near the edges of the map.

Since unsupervised learning algorithms may occasionally produce suboptimal solutions, the method 10 may furthermore comprise or may be performed in combination with a quality test which could use a more complex data set acquisition. For example, quality assurance and monitoring procedures may provide timely indication of suboptimal calibration, in which case the calibration procedure may be repeated, assuming the suboptimal solution was an outlier occurrence, or repeated with more stringent settings or averaged over a number of runs.

In a second aspect, the present invention relates to a nuclear imaging system.

Figure 2:
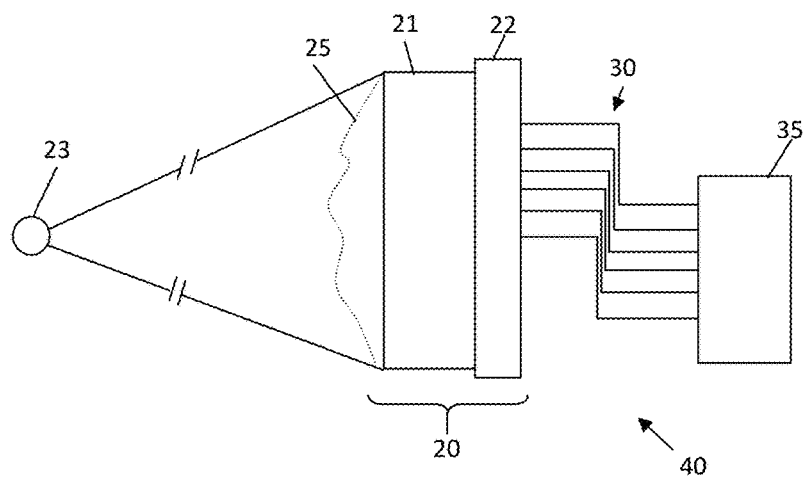
FIG. 2 shows an imaging system according to an embodiment of the present invention.

A nuclear imaging system 40 according to embodiments of the present invention is shown in FIG. 2. This system 40 comprises at least one gamma radiation detector 20, which comprises a monolithic scintillation crystal 21. For example the system 40 may comprise an imaging gantry on which a plurality of gamma radiation detectors 20 are arranged, each gamma radiation detector 20 comprising a monolithic scintillation crystal 21. The monolithic scintillation crystal 21 may comprise a Cerium doped Lutetium Yttrium Orthosilicate (LYSO), Lu0.4Gd1.6SiO5 (LGSO), $Bi_4Ge_3O_{12}$ (BGO) or NaI monolithic crystal. It will be clear to the person skilled in the art that, in principle, the monolithic scintillation crystal 21 may comprise any scintillation material suitable for gamma radiation detection, further examples of such scintillation materials include gadolinium oxyorthosilicate (GSO), cerium-doped lanthanum bromide ($LaBr_3(Ce)$) or plastic scintillators.

Furthermore, the at least one gamma radiation detector 20 may further comprise a position sensitive light sensor 22. The position sensitive light sensor 22 may for example comprise an avalanche photodiode array or a position sensitive photomultiplier tube. The position sensitive light sensor 22 may for example comprise an array of light sensors, e.g. a plurality of single-signal photomultiplier tubes.

The system 40 further comprises a processing unit 35. This processing unit 35 is adapted for recording 14 event data for a plurality of scintillation events, in which these event data comprise for each scintillation event a plurality of location sensitive signals 30 observed by the at least one gamma radiation detector 20.

The processing unit 35 is further adapted for applying 16 an unsupervised learning algorithm to embed these event data on a low-dimensional manifold, and for obtaining 17 calibration data taking into account this low-dimensional manifold embedding. In one aspect, the present invention also relates to the processing unit as described above, whereby the processing unit comprises an input port configured for receiving event data, in a stored manner or directly acquired by a nuclear imaging system.

In a further aspect, the present invention relates to a computer program product for, if implemented on a processing unit, performing some steps, e.g. the obtaining event data, the applying an algorithm and the obtaining calibration data steps, of a method according to the first aspect of the present invention, e.g. for performing a method according to the first aspect of the present invention. For example for performing such method entirely or partially, when the computer program product is implemented on a processing unit 35 of a nuclear imaging system 40 according to the second aspect of the present invention. The present invention also relates to a data carrier, e.g. a non-transistory data carrier, storing such computer program product according to embodiments of the present invention. The present invention also relates to the transmission of such computer program product over a network.

Theoretical considerations and working principles of the present invention will be presented hereinbelow in order to aid in understanding and reducing to practice of the present invention and with reference to a particular exemplary situation. However, the present invention is not intended to be limited by such considerations and principles in any way.

The main hypothesis used by a method according to embodiments of the present invention may be that the interaction coordinates of events, e.g. the position coordinates where the scintillation light in the scintillation crystal originated, acquired in the event data may be recovered up to some limit by organizing them within the known geometry of the detector, assuming that in advance the spatial distribution of radiation-matter interactions is known within the crystal. That distribution can for example be obtained very accurately by using Monte Carlo simulations. The organization process can be accomplished by unsupervised learning techniques and therefore the training data can be self-organized. In particular examples, self-organizing maps (SOM) may be used for the organization of the training data into a 2D map (for 2D position calibration) and the hereby obtained maps may be corrected for distortion using grid adaptation method, e.g. based on Mogen-Kantorovich (MK) optimization. In the self-organization process, a grid of neurons may be defined with as many parameters on each one as anode signals on each acquired event, e.g. 64 for data obtained from a 8×8 position-sensitive PMT. This grid may be initialized with random parameters in all neurons. Then training data may be introduced to this grid, following self-organizing map learning procedures until the map has converged.

Furthermore, after this process, training data may be organized within such grid, although a distortion may remain. This distortion can be removed or reduced with the MK grid adaptation method. Once the calibration is complete, positioning of new data, e.g. applying the calibration to newly acquired event data, may be as simple as searching for the neuron that best matches each measured event (e.g. similar to a nearest neighbor approach). The event may thus be localized to the position determined by this neuron position and after applying the distortion correction. The steps of an exemplary self-calibration method according to embodiments of the present invention are illustrated in more detail hereinbelow.

The different steps of the calibration method were studied in detail on simulated and measured data, as provided as example further below. These simulations accounted for the physics of interactions of gamma photons within the scintillation crystal as well as the production, propagation and detection of optical photons, the photosensor response and electronics readout. The controlled environment used for these examples allowed guiding the decisions made in the steps of the exemplary calibration process described hereinbelow. The exemplary procedure was tested in SPECT and PET detector prototypes, as further demonstrated below.

A training data set may be acquired for the calibration. A radioactive source may be placed in the field of view of the scanner for this purpose, preferably in a way that all detectors get the same distribution of gamma interactions, such that all detectors can be calibrated simultaneously and with the same process, e.g. simultaneously obtained training data. The distribution of gamma interaction within the detector may be obtained using Monte Carlo simulations. The geometry of the radioactive source could be a point, line, plane, etc, which may be chosen optimally according to the geometry of the scanner and the detectors. Here, a point source was used for the sake of simplicity, since a uniform distribution of gamma photons can be obtained by placing the source far enough from the detector. The energy of the gamma photons emitted by the source may be chosen according to the application. A high number of events may be acquired for each detector, such that the noise may be reduced, e.g. minimized, in the calibration process. For a PET detector, training data may be obtainable in singles mode acquisition. However, in cases where self-radiative scintillation crystals are used, e.g. LYSO, acquisition in coincidence mode may be required in order to discriminate between events coming from the source and autoradiative events.

Once the training data set is acquired the events may be filtered by energy. As energy calibration is position dependent, events from similar positions may have to be grouped first. Then, an energy calibration may be applied to the events of each group independently, and finally the events within a prescribed energy window can be filtered. It may be pointed out that the position of the groups does not have to be known for this step of the process, but only the fact that all events within each group belong to nearby positions. To split the events in different groups, the Linde-Buzo-Gray algorithm may be used. The number of groups may be chosen high enough to allow for proper separation of events with different photopeak locations. In some situations a pure centroid calculation might suffice to perform the event clustering.

Once the training data set was filtered, the events were organized in a map with as many dimensions as required by the event positioning that will be obtained. A type of artificial neural network known as self-organizing map (SOM) was used to organize the training set in a grid with proportional size to the size of the monolithic crystal. A self-organizing map (SOM) is a type of artificial neural network (ANN) that is trained using unsupervised learning to produce a low-dimensional (typically two-dimensional), discretized representation of the input space of the training samples (x), called a map. Self-organizing maps are different from other artificial neural networks in the sense that they use a neighborhood function to preserve the topological properties of the input space. A self-organizing map consists of components called nodes or neurons ($m_i$). Associated with each node is a weight vector of the same dimension as the input data vectors, and a position in the map space. The usual arrangement of nodes is a regular spacing in a hexagonal or rectangular grid. The self-organizing map describes a mapping from a higher dimensional input space to a lower dimensional map space. The procedure for placing a vector from data space onto the map is to first find the node with the closest weight vector to the vector taken from data space. Once the closest node is located it is assigned the values from the vector taken from the data space.

Random values can be taken as the initialization map for the self-organizing map. However, to ensure convergence an additional self-organizing map can be created that learns the centroid positions of the training data. After this map was created, the average of all the events belonging to each location was computed and used as the initial map.

The map may be fed a large number of training data that represent, as close as possible, all the kinds of events expected during a real acquisition. The examples are usually administered several times as iterations. The training utilizes competitive learning. When training data is fed to the map, its Euclidean distance (d) to all weight vectors is computed. The cell whose weight vector is most similar to the input event is called the best matching unit (BMU).

$$bmu = \underset{i}{\operatorname{argmin}}\{d(x, m_i)\}$$

The weights of the BMU and neurons close to it in the SOM lattice are adjusted towards the input vector. The magnitude of the change decreases with time and with distance from the BMU according to a neighborhood function. A Gaussian function may be chosen to define the neighborhood size and weights during the learning process.

$$N_i(t) = \prod_{n=1}^{dim} \exp\left(-\frac{\|\vec{r_i} - \vec{r_{bmu}}\|^2}{2\sigma_n^2(t)}\right)$$

In the batch version of SOM algorithm, which was used in this example, the BMU for a number of events from the input data is obtained and a new update for each cell is obtained as the weighted average of the events located within defined neighborhood. This process is repeated iteratively while reducing the size of the neighborhood function until the map is organized.

$$m_i(t+1) = \frac{\sum_{j \in N_i} N_j(t) \sum_k x_k}{\sum_{j \in N_i} N_j(t)}$$

Most commonly SOM maps are two-dimensional although maps with any number of dimensions below the number of dimensions of the input data could be used. Therefore, in the present example it was chosen to use 2D maps for the calibration of SPECT detectors and 3D maps for the calibration of PET detectors.

The SOM method requires choosing the shape and size of the map together with the learning rate and size of the neighborhood function. The number of events used in each iteration is also a critical value. All these parameters must be studied in detail to obtain optimal results.

Once the training data set is organized, a histogram map with the number of events that belongs to each cell of the map must be obtained $\rho'(x',y')$. This map is then compared to the known distribution of interactions obtained with Monte Carlo simulations $\rho(x,y)$. The transformation that converts the map into the known distribution produce the final adjustment in the calibration process.

$$\rho'(x',y')dx'dy' = \rho(x,y)dxdy$$

A method for grid adaptation using Monge-Kantorovich (MK) optimization was used to calculate the grid transformation that makes both distributions matching with an optimal deformation. 2D and 3D versions of this method are used on SPECT and PET detector calibration respectively. There is not an unique option for this grid transformation. Although MK optimization defines an unique transformation with optimal distortion or smoothness, that doesn't warranty that is the transformation needed here. Therefore, the quality of the obtained results must be evaluated and additional constraints must be added if needed.

For $MK$-$2D$:

$$\nabla^2 \Phi + \frac{\partial^2 \Phi}{\partial x^2}\frac{\partial^2 \Phi}{\partial y^2} - \left(\frac{\partial^2 \Phi}{\partial x \partial y}\right)^2 = \frac{\rho(x,y)}{\rho'(x',y')} - 1$$

For $MK$-$3D$:

$$\det\begin{bmatrix} 1+\partial_{xx}\Phi & \partial_{xy}\Phi & \partial_{xz}\Phi \\ \partial_{yx}\Phi & 1+\partial_{yy}\Phi & \partial_{yz}\Phi \\ \partial_{zx}\Phi & \partial_{zy}\Phi & 1+\partial_{zz}\Phi \end{bmatrix} = \frac{\rho(x,y,z)}{\rho'(x',y',z')}$$

Several PET and SPECT detectors were used to validate the exemplary method according to embodiments of the present invention, which was explained in detail hereinabove. The performance of proposed calibration has been compared with the one obtained with the prior-art maximum likelihood estimation (MLE) calibration.

SPECT detectors are typically thin due to the low energy of the gamma photons used (~140 keV). Therefore, it is usually enough to provide the interaction coordinates of the gamma photon in two dimensions. On the other hand, PET detectors are thicker in order to improve the detection efficiency of higher energy gamma photons (511 keV). Depth of interaction (DOI) estimation within the crystal has been proposed in order to avoid parallax error that would result in a degradation of the reconstructed image. Therefore, a 3D calibration of PET detectors may be preferable.

The SPECT detector used to demonstrate the exemplary method on real data was a 49×49×5 mm³ thick NaI crystal, coupled to a H8500 PS-PMT with a 2 mm thick light guide. All 64 anodes of the PS-PMT are read independently for each detected event.

In a further example, 3.2 million events were acquired for the training data with the SPECT detector using a $^{99m}$Tc point source located at 25 cm from the center of the detector surface. In order to group the acquired events to filter them by energy, a flood map with 30×30 pixels was obtained using the centroids of the events, shown in FIG. 6. All events belonging to the same pixel of the flood map were used to obtain the energy spectra and the photopeak positions (see FIG. 7). The events with energy out of ±10% of the photopeak position were rejected. 1.6 million events were kept after applying the energy filtering.

Figure 8:
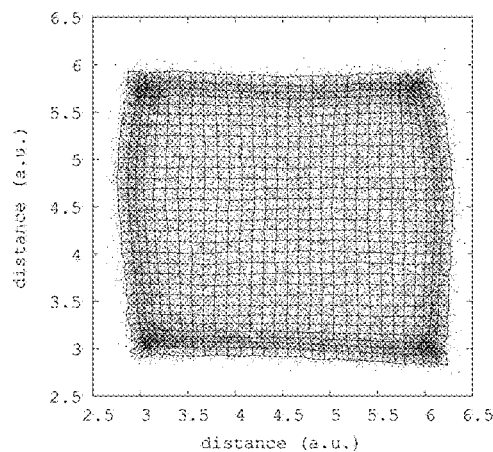
FIG. 8 shows a trained map according to embodiments of the present invention, with 91×91 cells, depicted by the full lines, in which the number of cells was decreased in the figure for clarity, using the centroids of the events of the event data, depicted by dots. Each cell is represented with the 2 components of each weight vector.

The centroids of those filtered events were later used to train a map with 91×91 cells using SOM method. Each cell contained a two components weight vector, as many as dimensions in the centroid values, shown in FIG. 8. The initial values of the map were obtained by placing a regular grid matching approximately the distribution of centroids. The batch-SOM algorithm was used to train the map using a 2D Gaussian neighborhood function with an initial $\sigma_0$=24.5 mm and neighborhood size of one a. The value of the σ was decrease on each iteration according to $$\sigma(t) = \frac{c\sigma_0}{c+t},$$

with c=8 and t the iteration number. $10^5$ events were sequentially chosen from the event list and used for each iteration update. Once all the events were used they are taken back from the beginning of the list on a loop. The training was stopped after 170 iterations when a σ of 1 mm was reached.

Once the training process was completed, each element of the training data was assigned to its BMU and the initial map for the SOM training with all 64 dimensions was calculated with the average of all the events belonging to each cell.

$$m_i\{k\}(t=0) = \frac{\sum_{n \in i} x_n\{k\}}{\sum_{n \in i} 1}$$

The configuration for the learning rate, number of events per iteration, initial neighborhood function and number of iterations was chosen in a trial and error process but many other configurations may lead to a good initial map as well. This initial map can ensure that the map obtained in the later training with all 64 dimensions will have the same and therefore known orientation. Otherwise, any factor of 90 degrees rotation or flip in horizontal or vertical direction could be obtained from an initial map with random values. In case that orientation problem occurs, we could select one event from each corner of the centroids distribution and correlate them with their location in the training map to extract the orientation of the latest one.

Figure 9:
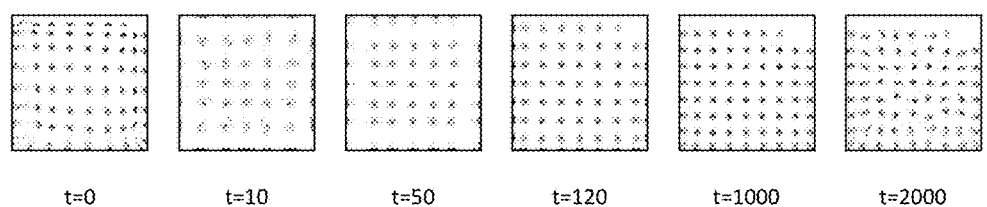
FIG. 9 shows a plurality of histograms of the BMUs distribution for the events of the 5.5 mm grid scan, according to embodiments of the present invention, in which t=0 correspond to the initial map.

Starting with the initial map obtained previously, the batch-SOM algorithm was used on a map of the same size (91×91) until convergence was reached. An initial $\sigma_0=12.25$ mm, a neighborhood size of $2\sigma$, a learning rate c=80 and $10^5$ events per iteration were used. To speed up the process the BMU for each event was stored and the same event was used in later iteration only those cells in the vicinity of the stored BMU are used to find the new BMU. In order to assess the quality of the training map, the events acquired in the 5.5 mm step grid scan were employed. The top row of scan positions and two more from the second row were removed in order to facilitate the visually inspection of the orientation of the map. For a given trained map, all BMUs for the events in the 5.5 mm scan are computed and a histogram of those is obtained. The histograms obtained after different number of iterations were used to visualize the convergence process, shown in FIG. 9. It can be observed how the organization is performed on a larger scale during the first 120 iterations when the neighborhood function is larger and the smaller detail is later obtained at a slower rate according to the defined learning rate. We observed that, once the neighborhood function is smaller than the spatial resolution expected for this detector, the overall organization is lost and some distortions appear; e.g. see t=2000 case shown in FIG. 9. Therefore, the map obtained after 1000 iterations ($\sigma=1.7$ mm) was selected.

Figure 10:
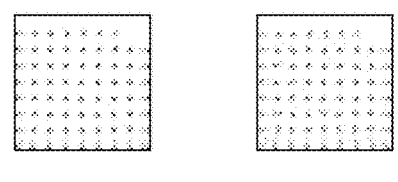
FIG. 10 shows histograms of the BMUs distribution for the events of the 5.5 mm grid scan, according to embodiments of the present invention, with a size of neighborhood function not smaller than 1.08 mm.
Figure 11:
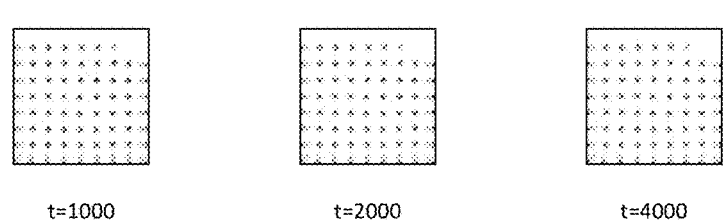
FIG. 11 shows histograms of the BMUs distribution for the events of the 5.5 mm grid scan, according to embodiments of the present invention, where a uniform background of 20% of the maximum is added to the neighborhood function.

Setting the minimum size of the neighborhood function to 1.08 mm in order to avoid distortion resulted in the map thus obtained to still show some distortion for high number of iterations, see FIG. 10. Another approach tested to avoid local distortion was to add a uniform background of 20% of the maximum value to the neighborhood function, shown in FIG. 11. In that way the local distortion did not appear but once the sigma value is of the order of half of the cell size the noise is amplified. Therefore, the lather neighborhood function seems to be a good option for the training process when stopping the training once the $\sigma$ is getting close to half of the size of the cell.

Figure 12:
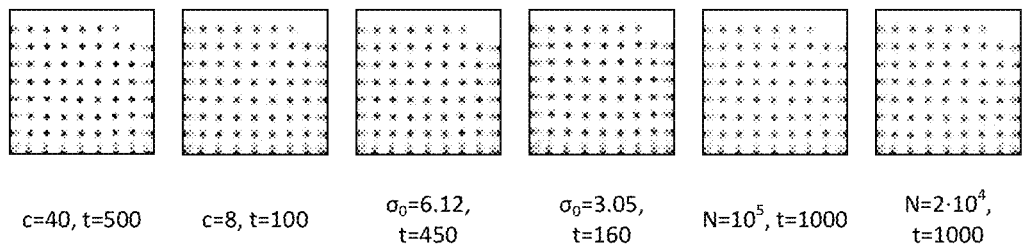
FIG. 12 shows histograms of the BMUs distribution for the events of the 5.5 mm grid scan, according to embodiments of the present invention. These maps show the results from different strategies followed to speed up the training process. The two maps on the left show learning rates 2 (c=40) and 10 (c=8) times faster than the reference case (c=80). The 2 maps in the middle show results when smaller $\sigma_0$ were used. The two maps on the right show the results when lower number of events (N) per iteration is used.

In order to speed up the training process faster learning rates, smaller $\sigma_0$ and lower number of events were used per iteration. Results shown in FIG. 12, in which for the same value of $\sigma$ the iterations were stopped, show that similar quality can be obtained in a much shorter time. Only for the case of very low number of events per iteration (N=2.10) some distortion appears. The times needed to reach the convergence ($\sigma=1.7$ mm) for all studied case are shown in following table:

| Configuration | Time (sec) |
| --- | --- |
| c = 40 | 2925 |
| c = 8 | 600 |
| $\sigma_0$ = 6.12 | 1700 |
| $\sigma_0$ = 3.05 | 400 |
| N = $10^5$ | 5700 |
| N = $10^4$ | 1020 |

Figure 13:
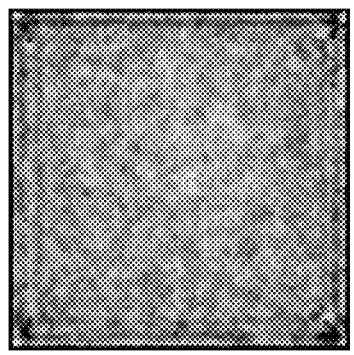
FIG. 13 shows the distribution of the events in the training data after self-organization process, according to embodiments of the present invention.
Figure 14:
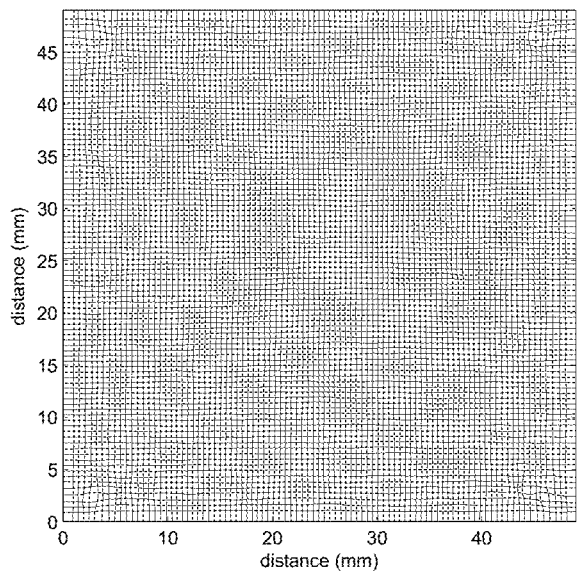
FIG. 14 shows the distribution of the events of the training data after distortion correction was applied to the grid shown in FIG. 13 using MK grid adaptation method in order to match the known events distribution, according to embodiments of the present invention.

Going back to the map obtained after 1000 iterations with the initially proposed training configuration, the BMUs for all elements in the training data were computed and a histogram of their distribution was obtained, see FIG. 13. This histogram was used as the input density distribution of the MK grid adaptation method and the transformation needed to obtain a uniform distribution was computed. A Newton Krylov solver was used, using the parameters provided in the table here below. The direct approach of the Monge-Ampère equation was employed. The grid transformation obtained is shown in FIG. 14. It can be observed how the regions with higher concentration were transformed into cells with a bigger area.

| Parameter | Symbol | Value |
| --- | --- | --- |
| Absolute tolerance (N = number of cells in the grid) | $\varepsilon_a$ | $N^{1/2} \cdot 10^{-15}$ |
| Relative tolerance | $\varepsilon_r$ | $10^{-4}$ |
| Maximum number of nonlinear iterations | maxit | 40 |
| Maximum number of inner iterations before restart | maxitl | 40 |
| Maximum error tolerance for residual in inner iteration | $\eta_{max}$ | 0.9 |
| Linear iterative method | lmeth | GMRES |

Figure 15:
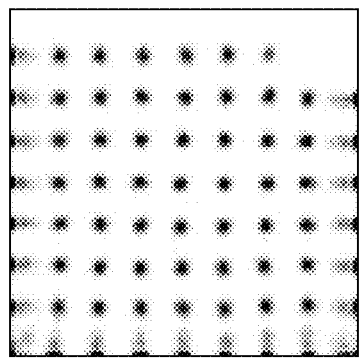
FIG. 15 shows a histogram of the BMUs obtained for the 5.5 mm grid scan obtained after SOM training, according to embodiments of the present invention.
Figure 16:
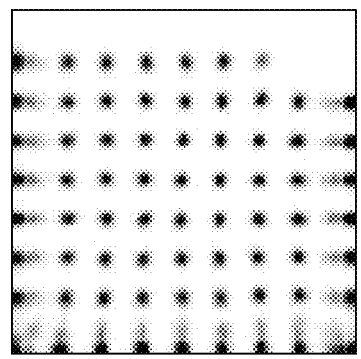
FIG. 16 shows a histogram of the BMUs obtained for the 5.5 mm grid scan obtained after SOM training and MK distortion correction, according to embodiments of the present invention.
Figure 17:
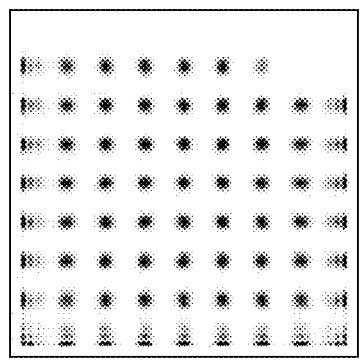
FIG. 17 shows a histogram of the BMUs obtained for the 5.5 mm grid scan obtained after MLE, according to a prior-art method.
Figure 18:
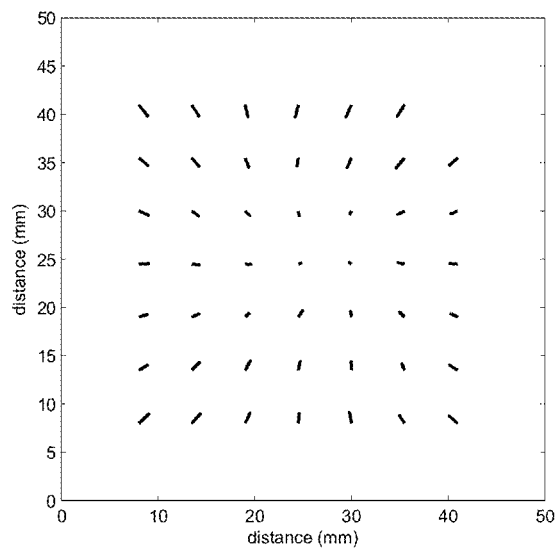
FIG. 18 shows lines joining the average centroid positions and the real positions for the inner 7×7 scan positions, corresponding to the histogram shown in FIG. 15.
Figure 19:
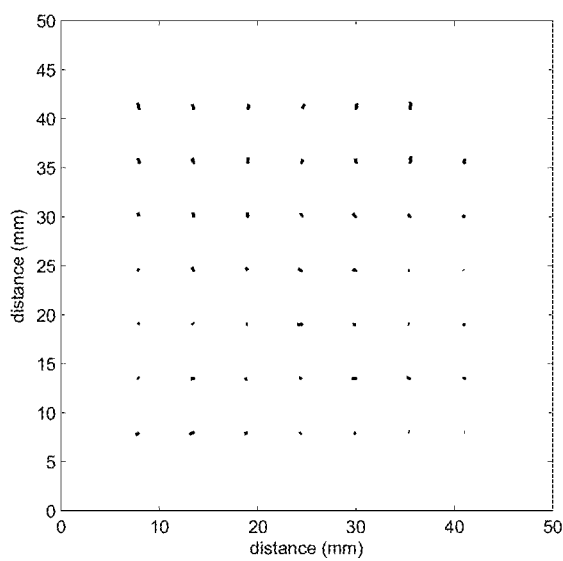
FIG. 19 shows lines joining the average centroid positions and the real positions for the inner 7×7 scan positions, corresponding to the histogram shown in FIG. 16.

In order to apply that transformation on a given histogram of BMUs, a 2D interpolation was used. FIG. 15 and FIG. 16 show the histogram of BMUs obtained for the 5.5 mm grid scan data, respectively before (SOM) and after (SOM+MK) applying the grid adaptation obtained previously. FIG. 17 shows the histogram obtained for the same data set using MLE positioning method. In FIG. 18 to FIG. 20, the lines joining the average centroid positions and the real positions are shown for the inner 7×7 scan positions, respectively for SOM, SOM+MK and MLE. The average bias obtained for the SOM, SOM+MK and MLE centroids was 1.08, 0.39 and 0.09 mm respectively.

The spatial resolution obtained for each of the inner 7×7 scan positions using MLE and self-calibration methods is shown in FIG. 21 and FIG. 25 respectively, obtaining an average spatial resolution of 1.32 and 1.45 mm respectively. In order to attempt improving the spatial resolution, two other neighborhood functions were tested, as given by the two equations herebelow. However, very similar spatial resolution results were obtained.

$$N_i(t) = 0.2 + 0.8 \cdot \exp\left(-\frac{\|\vec{r_i} - \vec{r_{bmu}}\|^4}{2\sigma^2(t)}\right)$$

$$N_i(t) = 0.2 + 0.8 \cdot \frac{(0.5 \cdot \sigma^2(t))^2}{\|\vec{r_i} - \vec{r_{bmu}}\|^2 + (0.5 \cdot \sigma^2(t))^2}$$

In another experiment, 3D positioning was pursued on PET detectors. The method was applied to a detector based on a 49×49×22 mm³ LYSO monolithic crystal coupled to a 64 channels PS-PMT H10966 (Hamamatsu). Event data, on which training data was based, was acquired with a point source of Na-22 located at 25 cm from the center of the detector surface. It is assumed that the distribution of the gamma interactions within each transverse slice of the crystal was uniform. A map of 49×49×6 cells with 64 components vector on each cell (as many as anodes in the input data) was used in the calibration process. For assessment of the quality of the calibration additional data was acquired using a collimated beam of 511 keV gammas. In order to remove the LYSO activity background all training and beam data were acquired in coincidence with other detector consisting in a 12×12×22 mm3 LYSO crystal coupled to a PMT H6533 (Hamamatsu). A 2D scan with 5 mm step was accomplished. For MLE calibration a 2D scan with 2 mm step was acquired and pdf functions were interpolated into a finer grid with 1 mm step.

The validation of the calibration method on PET detectors was first carried out on simulated data. For that purpose, a simplified scenario was assumed where trained data was obtained from a uniform distribution of gamma interactions in the detector. All interactions were assumed to happen by photoelectric effect so all the energy is deposit in a single position. The propagation of the optical photons was performed using a simulation tool developed in-house. The entrance side of the crystals wasset polished and while the sides were rough. Entrance and sides were covered with white reflector.

Figure 3:
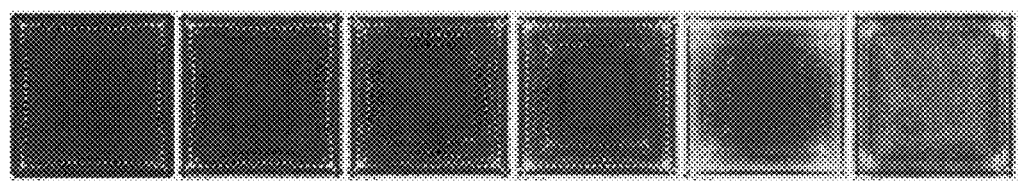
FIG. 3 shows the distribution of training data in a 3D map after a SOM process according to embodiments of the present invention. Several detector slices are shown starting on the left with the section close to the PS-PMT.

The self-organization step was performed in a 3D map with 49×49×6 cells. In order to obtain an initialization map for the SOM step the 2D centroid and the value of the maximum anode were computed as a first estimated of the XY position and DOI respectively. Those coordinates were fed into a SOM map with the same size of final map but with 3 components vectors on each cell and iterated until convergence was reached. The average of the training data on each cell is used to calculate the initial map for the complete SOM calculation. Once the learning process is completed a histogram containing the distribution of all the events from the training map is obtained, shown in FIG. 3. The 3D variation of the MK grid adaptation method is used to obtain the deformation that has to be applied to this map to obtain the known uniform distribution of the training data, see FIG. 4.

A 2D grid scan with 5 mm step was simulated and obtained calibration was applied to it probing the successful output of the calibration process, see FIG. 5. It is possible to observe how the spatial resolution obtained close to the PMT (shown left) is better than close to the entrance (shown right). Also spatial resolution degrades at the edges of the crystal.

In conclusion, a method for calibration of monolithic detectors according to embodiments of the present invention may achieve the same performance as state of the art methods, as demonstrated by the examples hereinabove, but in a more efficient way. Such method enables the calibration of detectors simultaneously, even while assembled in imaging systems. A method according to embodiments of the present invention was tested on a SPEC detector based on 49×49×5 mm3 crystal for 2D positioning and on a PET detector based on a 49×49×22 mm3 LYSO crystal for 3D positioning.

Several other factors may influence the optimal performance of the self-calibration method. For example, the number of readout channels used from the photosensor array may be taken into account. The lower the number of channels needed to obtain the same performance of the method the simpler and more cost-efficient the read-out of the detector will be. In addition, some parts of the method might be implemented in field programmable gate array (FPGA) devices and general-purpose graphical processing units (GPGPU) to achieve the calibration in a reasonable time.

It is an advantage of embodiments of the present invention that it enables use of monolithic crystals in future PET and SPECT systems. Such systems can benefit from overall improved performance of monolithic crystals compared to pixelated detectors along with a much-reduced cost of production.

The invention claimed is:

1. A calibration method for calibrating at least one gamma radiation detector comprising a monolithic scintillation crystal, the calibration method comprising:
    obtaining event data for a plurality of scintillation events, the event data comprising for each scintillation event a plurality of location sensitive signals observed by said at least one gamma radiation detector to be calibrated by exposing the at least one gamma radiation detector to a predetermined distribution of radiation, the event data being organized in a self-organizing map;
    applying an unsupervised learning algorithm in a processor to embed at least part of said event data organized in a self-organizing map on a low-dimensional manifold such that each position on the low-dimensional manifold is representative of a position for the scintillation event in the monolithic scintillation crystal; and
    obtaining calibration data in the processor for linking event data for a scintillation event to a spatial region where this scintillation event took place, said obtaining calibration data taking into account said low-dimensional manifold embedding, the method further comprising correcting the calibration data for distortion in the processor, said correcting taking into account information about the predetermined distribution of radiation by deforming the obtained self-organizing map to match the predetermined distribution while keeping the external shape of the map, which corresponds to the detector shape, as a boundary condition.

2. The calibration method according to claim 1, in which said plurality of location sensitive signals are representative of a spatial distribution of scintillation light in said monolithic scintillation crystal.

3. The calibration method according to claim 1, in which said low-dimensional manifold is commensurate with at least two physical spatial dimensions of said monolithic scintillation crystal.

4. The calibration method according to claim 1, wherein applying the unsupervised learning algorithm comprises applying a nonlinear dimensionality reduction algorithm for learning said low-dimensional manifold embedded in a space with dimensionality corresponding to said plurality of location sensitive signals.

5. The calibration method according to claim 1, wherein said unsupervised learning algorithm comprises a learning algorithm for determining a self-organizing feature map.

6. The calibration method according to claim 1, furthermore comprising determining data clusters from said event data, and initializing said unsupervised learning algorithm taking into account said data clusters.

7. The calibration method according to claim 1, wherein exposing said at least one gamma radiation detector to the predetermined distribution of radiation comprises placing a radioactive source in the field of view of the at least one gamma radiation detector.

8. The calibration method according to claim 7, wherein the radioactive source is placed such that at least two gamma radiation detectors receive a substantially identical distribution of radiation from said radioactive source.

9. The calibration method according to claim 7, wherein the radioactive source is placed at a distance from the at least one gamma radiation detector, said distance being equal to or greater than the largest spatial extent of said monolithic scintillation crystal.

10. A nuclear imaging system comprising at least one gamma radiation detector comprising a monolithic scintillation crystal, the system further comprising a processing unit, said processing unit being adapted for:
  recording event data for a plurality of scintillation events, said event data comprising for each scintillation event a plurality of location sensitive signals observed by said at least one gamma radiation detector to be calibrated by exposing the at least one gamma radiation detector to a predetermined distribution of radiation, the event data being organized in a self-organizing map;
  applying an unsupervised learning algorithm to embed at least part of said event data organized in a self-organizing map on a low-dimensional manifold such that each position on the low-dimensional manifold is representative of a position for the scintillation event in the monolithic scintillation crystal; and
  obtaining calibration data for linking event data for a scintillation event to a spatial region where this scintillation event took place, said obtaining calibration data taking into account said low-dimensional manifold embedding and further comprising correcting the calibration data for distortion, said correcting taking into account information about the predetermined distribution of radiation by deforming the obtained self-organizing map to match the predetermined distribution while keeping the external shape of the map, which corresponds to the detector shape, as a boundary condition.

11. A processor for calibrating at least one gamma radiation detector comprising a monolithic scintillation crystal, the processor comprising:
  an input means for obtaining event data for a plurality of scintillation events, the event data comprising for each scintillation event a plurality of location sensitive signals observed by said at least one gamma radiation detector to be calibrated by exposing the at least one gamma radiation detector to a predetermined distribution of radiation, the event data being organized in a self-organizing map, the processor being furthermore configured for;
  applying an unsupervised learning algorithm to embed said event data organized in a self-organizing map on a low-dimensional manifold such that each position on the low-dimensional manifold is representative of a position for the scintillation event in the monolithic scintillation crystal; and
  obtaining calibration data taking into account said low-dimensional manifold embedding and correcting the calibration data for distortion, said correcting taking into account information about the predetermined distribution of radiation by deforming the obtained self-organizing map to match the predetermined distribution while keeping the external shape of the map, which corresponds to the detector shape, as a boundary condition.

12. A computer program product for, if implemented on a processing unit, performing a method according to claim 1.

13. A non-transistory data carrier storing the computer program product according to claim 12.

* * * * *